(12) United States Patent
Gwyther

(10) Patent No.: US 6,461,232 B1
(45) Date of Patent: Oct. 8, 2002

(54) TOE WEB CUTTER WITH STATIONARY BLADE UNIT

(75) Inventor: Peter Gwyther, Madison, CT (US)

(73) Assignee: Jarvis Products Corporation, Middletown, CT (US)

(*) Notice: Subject to any disclaimer, the term of this patent is extended or adjusted under 35 U.S.C. 154(b) by 0 days.

(21) Appl. No.: 09/772,020

(22) Filed: Jan. 29, 2001

(51) Int. Cl.⁷ .............................................. A22C 17/00
(52) U.S. Cl. ...................................... 452/166; 452/64
(58) Field of Search ............................. 452/166, 49, 64

(56) References Cited

U.S. PATENT DOCUMENTS

| | | |
|---|---|---|
| 1,085,793 A | 2/1914 | Boettger |
| 1,349,916 A | 8/1920 | Rece |
| D207,485 S | 4/1967 | Belknap |
| 3,488,797 A | 1/1970 | Dirks |
| 3,893,237 A | 7/1975 | Jahnke |
| 4,214,492 A | 7/1980 | Hoffman |
| 4,241,631 A | 12/1980 | Salvatore |
| 4,336,652 A | 6/1982 | Robertson |
| 4,463,641 A | 8/1984 | Sato |
| 4,543,719 A | 10/1985 | Pardoe |
| 4,558,515 A | 12/1985 | LaBounty |
| 4,608,754 A | 9/1986 | Kloster |
| 4,662,371 A | 5/1987 | Whipple et al. |
| 4,686,767 A | 8/1987 | Ramun et al. |
| 4,747,212 A | 5/1988 | Cavdek |
| 5,083,971 A | 1/1992 | Karubian et al. |
| 5,142,779 A | 9/1992 | LaBounty |
| 5,152,713 A | 10/1992 | Baertlein |
| 5,187,868 A | 2/1993 | Hall |
| 5,421,773 A | 6/1995 | Meyer |
| 5,454,754 A | 10/1995 | Baertlein |
| 5,514,031 A | 5/1996 | Meyer |
| 6,062,971 A | 5/2000 | Baertlein |
| 6,062,973 A | 5/2000 | Baertlein |

OTHER PUBLICATIONS

Jarvis Products Corporation, *Model TWC-1 Hog Toe Web Cutter Brochure*, pp. 1–12, Jarvis Products Corporation, 33 Anderson Road, Middletown, CT 06457.

*Primary Examiner*—Peter M. Poon
*Assistant Examiner*—Joan M. Olszewski
(74) *Attorney, Agent, or Firm*—DeLio & Peterson, LLC

(57) ABSTRACT

A toe web cutter has a pivoted inner hooked blade and stationary outer blades adjacent to the sides and end of the inner blade. Cutting edges on the adjacent blades produce an elongated cut to remove the web from between the toes of a carcass. The stationary outer blades allow the tool to be aligned before the cut is made by placing the stationary blades in contact with the web at the desired location for the cut. The inner blade is pivoted by a trigger-operated pneumatic drive mechanism, which includes a piston and a drive rod. The drive rod is connected through a link to drive the inner blade. The link produces a side load on the drive rod that is counteracted by a wheel mounted on the end of the drive rod and by a fixed reaction plate that supports the wheel as it rolls.

11 Claims, 2 Drawing Sheets

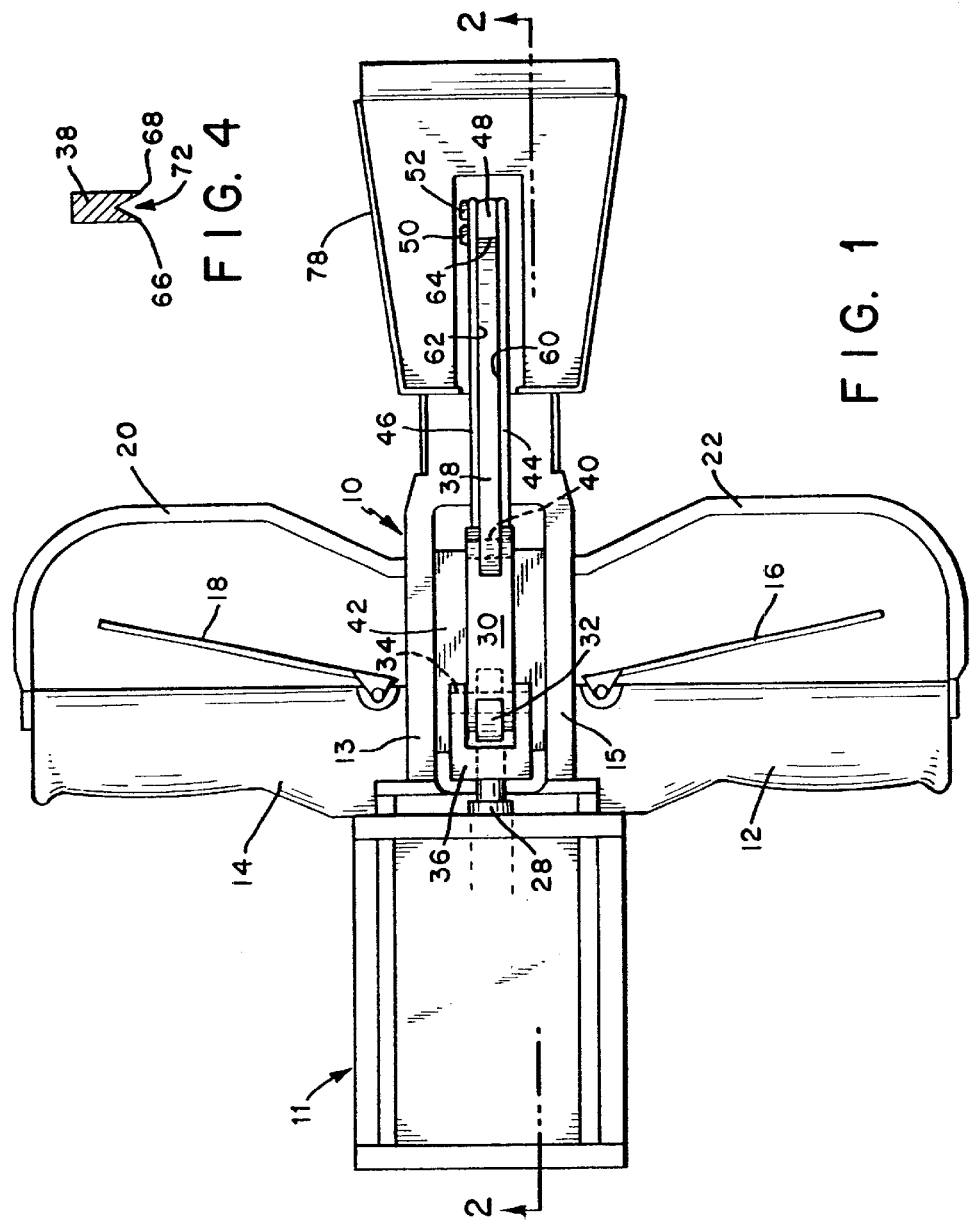

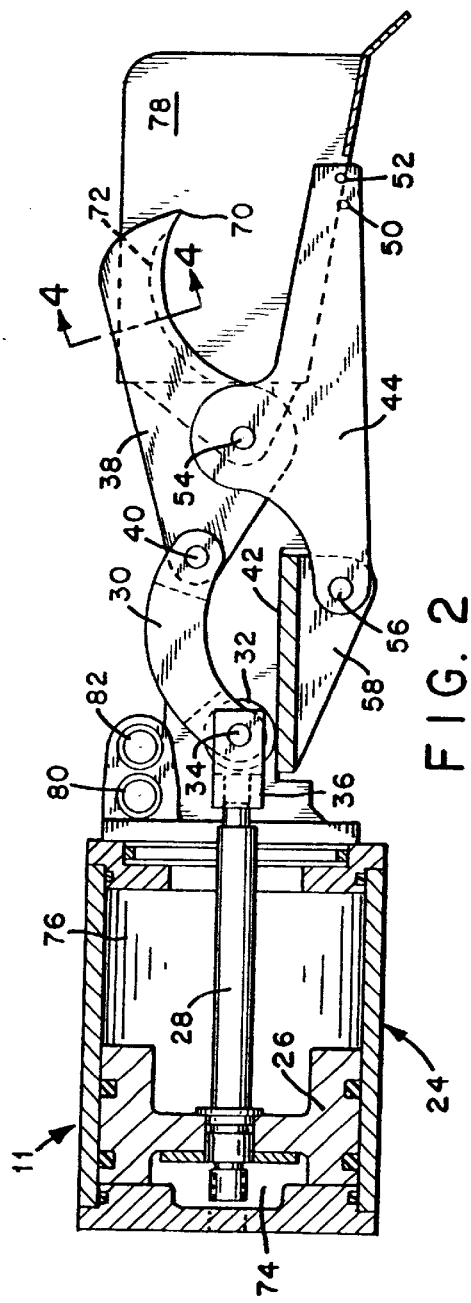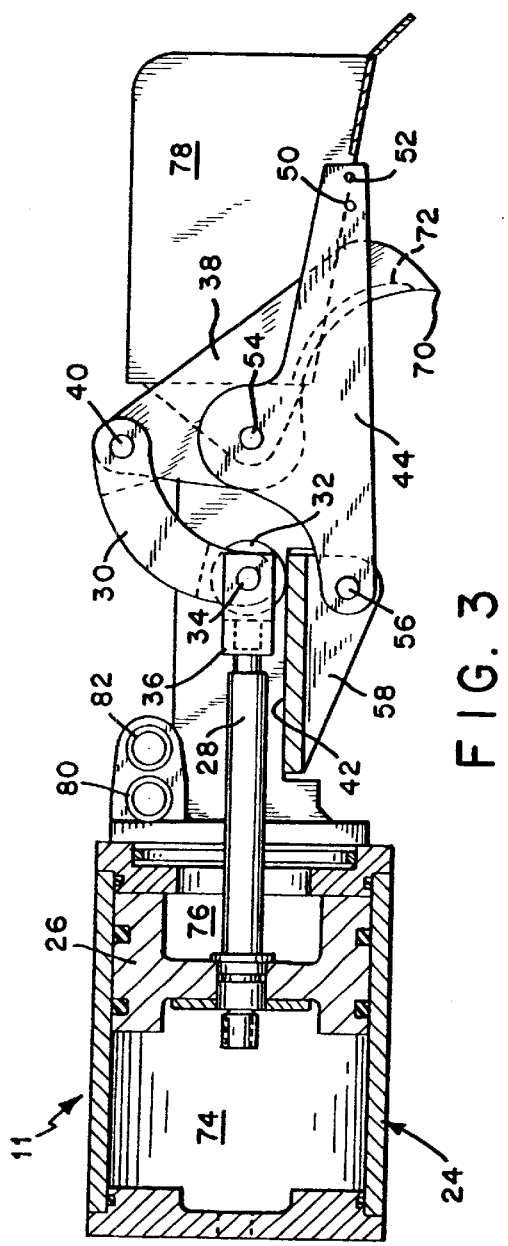

TOE WEB CUTTER WITH STATIONARY BLADE UNIT

BACKGROUND OF THE INVENTION

1. Field of the Invention

The present invention relates to cutters used in the meat processing industry to remove the web from between the toes of a carcass.

2. Description of Related Art

Toe web cutters are used in meat processing facilities to remove the web from between the toes of a carcass, such as a hog carcass.

In toe web cutters of the type shown in U.S. Pat. No. 5,454,754, an inner hook-shaped blade is pivotally connected between an outer pair of side blades. An end blade mounted between two parallel side blades forms an outer blade unit that surrounds three sides of the inner blade. The outer blades and the inner hooked blade define a cut that removes the toe web as the inner blade passes between the side outer blades and past the end blade. A drive mechanism simultaneously pivots both the outer blade unit and the inner hooked blade to make the cut.

The tip of the inner blade passes by the end blade and defines a cut point. The cut point is at the maximum depth to which the web removal cut will extend between the toes of the carcass. When the inner blade is hooked, the cut begins at this point as the hook penetrates the web between the toes. Regardless, of whether the inner blade is hooked, however, it is important that the cut point at the end of the blades be correctly aligned relative to the carcass toes to ensure complete removal of the web.

Achieving this correct alignment, however, has been difficult when using existing toe web cutters. The difficulty resides in the fact that both blades move relative to the cut point located at a position that is midway between them. Often the operator of the toe web cutter will initially attempt to position the tool relative to the carcass by placing the one of the blade units in the correct position relative to the toe web. However, when the tool is actuated, the blade positioned against the carcass begins to move and correct alignment is lost. To compensate for the relative motion between the blade and the cut point, the body of the tool can be moved simultaneously in an opposite counteracting motion. The tool is relatively heavy, however, and repeatedly moving it in a counteracting motion is tiring.

Alternatively, the operator can attempt to initially position the tool so that the toe web is at the correct final cut point midway between the ends of the two blade units. However, achieving the correct alignment this way is also difficult as there is no part of the tool actually located at the cut point that can be used to contact the carcass and hold the tool at the right position. Even when correct alignment is initially achieved, because both blade units move during the cut, and because neither is in contact with the carcass, correct alignment can be lost before the cut actually begins.

Using either method, cutting is awkward due to the relative motion between the cut point and both of the blade units. Neither the inner hooked blade nor the outer three-blade unit can be used to easily see where the final cut will be made.

Bearing in mind the problems and deficiencies of the prior art, it is therefore an object of the present invention to provide a toe web cutter having a cut point that remains stationary relative to one of the blades so that the blades can be used to correctly align the tool relative to the carcass toe before the cut is made.

It is a related object of the present invention to provide a toe web cutter having a cut point that also remains stationary relative to the body of the tool so that the tool can be operated without requiring a counteracting motion of the body of the tool.

It is a further object of the present invention to provide a toe web cutter with a stationary blade unit that can be placed in contact with the toe web and the carcass to stabilize the tool relative to the carcass during the cut.

Still other objects and advantages of the invention will in part be obvious and will in part be apparent from the specification.

SUMMARY OF THE INVENTION

The above and other objects, which will be apparent to those skilled in art, are achieved in the present invention which is directed to a toe web cutter having a tool body, at least one handle connected to the tool body, and inner and outer blade units. The inner blade unit includes a pair of side cutting edges and an end cutting edge. The blade units are pivotally connected to each other and cooperate to cut along the side cutting edges and the end cutting edge to remove the toe web from the carcass.

A drive mechanism is connected to the tool body and drives one of the blade units relative to the other blade unit. The driven blade unit pivots and the other blade unit is stationary, defining a toe web cutting location at a fixed position relative to the stationary blade unit and the tool body. This allows the tool to be guided into correct alignment with the toe web by aligning the stationary blade unit relative to the toe web.

A trigger mechanism is located near the handle and is operable by hand while the handle is being gripped. The use of a stationary blade design ensures that the cutting location does not move after the tool has been correctly aligned. In the preferred design, two handles and two interlocking triggers are provided and the inner blade unit is a single hook-shaped blade, with the outer blade unit being stationary.

In one aspect of the invention, the drive mechanism includes a drive rod that is connected to the driven blade unit through a link. The link is pivotally connected at its ends between the drive rod and the driven blade unit. In another aspect of the invention, the tool body includes a reaction plate, the drive rod being supported against transverse motion by the reaction plate. The preferred method of supporting the drive rod is by a support wheel that is mounted on the drive rod and contacts the reaction plate to support the drive rod against transverse deflection.

In still another aspect of the invention, the link is constructed with a forked end and the wheel is mounted within the forked end of the link. The drive rod may also be constructed with a forked end, with the wheel being mounted within the forked end of the drive rod.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 provides a top plan view of a toe web cutter according to the present invention.

FIG. 2 provides a side cross sectional view of a toe web cutter according to the present invention taken along the line 2—2 in FIG. 1. The tool is shown with the blades in the open position.

FIG. 3 is a side cross sectional view of a toe web cutter according to the present invention, corresponding to FIG. 2, except that the blades are shown in the closed position.

FIG. 4 is a cross sectional view through the inner hooked blade taken along the line 4—4 in FIG. 2.

DESCRIPTION OF THE PREFERRED EMBODIMENTS(s)

In describing the preferred embodiment of the present invention, reference will be made herein to FIGS. 1–4 of the drawings in which like numerals refer to like features of the invention.

Referring to FIG. 1 of the present invention, the toe web cutter includes a tool body 10 having a right handle 12 and a left handle 14. Corresponding triggers 16, 18 are mounted on the handles so that the operator's hands can actuate them while the tool is being held. The triggers operate a pneumatic drive mechanism 11 mounted on the body (see FIGS. 2 and 3). The drive mechanism may be mounted inside the body, or as-shown, mounted to the exterior of the body.

For safety, both the right trigger 16 and the left trigger 18 must be operated in order for the blades to close. This ensures that the operator's hands will be on the handles and out of the cutting area. Handle guards 20 and 22 are provided to further protect the operator's hands during tool use.

Referring to FIG. 2, the drive mechanism 11 comprises a pneumatic cylinder 24, having a piston 26 and a drive rod 28 connected to piston 26. The piston 26 divides the cylinder into two regions 74, 76 on opposite sides of the piston. The piston moves reciprocally to extend and retract the drive rod 28 under pneumatic pressure. The handles, tool body and drive mechanism disclosed are substantially conventional and are known from earlier toe web cutter designs. Hydraulic and electrically operated drive mechanisms may also be used.

Piston 26 is connected to a link 30 through drive rod 28, fork 36 and axle pivot pin 34. A wheel 32 rolls inside the outer fork 36, and also within a forked end of the link 30, on axle pivot pin 34. The fork 36 is a separate piece that is threaded onto the end of the drive rod. Fork 36 is wide enough to receive the forked end of link 30. The axle pivot extends through this "fork within a fork" design to capture the wheel 32 at the center. The opposite end of the link 30 is also forked to receive the inner hooked blade 38. Link 30 is connected to blade 38 through pivot pin 40.

Wheel 32 rolls on reaction plate 42, which is mounted between two halves 13, 15 of the body of the tool 10 (see FIG. 1). The hooked blade 38 forms an inner blade unit that cooperates with an outer blade unit composed of two side blades 44 and 46 and an end blade 48. The end blade 48 has a thickness that is approximately the same of the thickness of the hooked inner blade 38. The end blade is held between the two side blades 44 and 46 with screws 50, 52. The inner hooked blade 38 is pivotally connected to the side blades 44 and 46 with pivot bolt 54. The pivot bolt 54 extends through the halves 11, 13 of the body as well as though the two blade units.

The outer blade unit is rigidly connected to the body so that it remains in a fixed position relative to the body and does not move during the cutting operation. The reaction plate 42 is mounted between the two halves 11, 13 of the body and includes a downwardly projecting piece 58 having a thickness approximately the same as the thickness of the hooked blade 38 and the end blade 48. A bolt 56 extends through the side blades and the downwardly projecting piece 58 to hold the lower blades in position. Because the reaction plate 42 and the downwardly projecting piece are rigidly connected to the body, the two bolts 56 and 54 hold the outer blade unit 44, 46, 48 in a fixed position relative to the tool body.

The widths of the end blade 48, the downwardly projecting piece 58 and the hooked blade 38 are all approximately the same and position the side blades 44 and 46 in parallel alignment immediately on either side of the hooked blade. The side blades 44 and 46 and the end blade 48 have inner cutting edges 60, 62 and 64 that cut adjacent to outer cutting edges 66, 68 and 70 on the hooked blade 38.

The cutting edges on the inner and outer blade units cooperate to make an elongated, substantially rectangular, cut to remove the toe web. The side cutting edges 66 and 68 on the hooked blade 38 pass adjacent to the inner cutting edges 60 and 62 on the outer blade unit. The end cutting edge 70 on the hooked blade is transverse to the side cutting edges 66 and 68 and passes immediately adjacent to the inner cutting edge 64 on end blade 48.

The cut between the end cutting edges 70 and 64 is made first due to the hooked shape of blade 38. The cut point is located at the midpoint of cutting edge 64 on end blade 48. The cut point is stationary relative to both the tool and one of the blade units (the outer blade unit). If desired, the inner blade may be made stationary and outer blade unit may move, however the design shown is preferred. After the tip of the hooked blade penetrates the web, the side cutting edges 66, 68 on the outside of the hooked blade 38 begin to cut along the inner cutting edges 60 and 62 on the side blades to complete the cut.

To improve performance, the hooked blade 38 is provided with an upwardly extending V-shaped notch 72 along its bottom surface between the cutting edges 66 and 68 (see FIG. 4). The V-shaped notch 72 begins close to the end cutting edge 70 and extends along the bottom surface of the hooked blade midway between the side cutting edges 66 and 68. The notch sharpens the cutting edge on the hooked blade.

To use the tool, the operator grasps the handles 12 and 14. When both triggers 16 and 18 are pulled, pressurized air is directed from valves connected to the triggers into the region 74 of the cylinder on the back side of piston 26. This drives the piston 26 and drive rod 28 forward to the extended position seen in FIG. 3. Link 30 then pivots the hooked inner blade 38 around pivot 54.

In prior art designs, the drive rod 28 was connected to a balanced mechanism which simultaneously pivoted the two blade units in opposite directions. This design maintained symmetrical forces on the drive rod 28 so that there was no tendency for the drive rod to be deflected radially. However, this earlier design suffered from the difficulties described previously. In particular, the motion of both blades relative to the point where they began the cut made it difficult to put the tool in the correct position and hold it there throughout the cut.

In contrast, in the present design, the cut point remains fixed relative to the handles and tool body as well as the outer blade unit. This allows the operator to position the stationary blade unit directly below the web on the carcass. With the blades in contact with the carcass, alignment is more easily maintained. The tool can then be operated without having the cut point move relative to the carcass.

However, this asymmetrical design applies an asymmetrical force that transversely loads the drive rod 28. To counteract this transverse force, reaction plate 42 and wheel 32 are provided. The body 10 rigidly supports reaction plate 42. Wheel 32 rides on the upper surface of the reaction plate, holding the rod straight. The support provided by wheel 32 prevents damage to the drive rod 28 or the pneumatic seal between the drive rod and the cylinder 24 due to the side force applied as the link 30 pushes upwards on the pivot 40 and the hooked blade 38.

Although a wheel or other rolling support is preferred, the drive rod can also be kept straight by providing a sliding support against the reaction plate, or by adding bearings to support the extension of the drive rod.

When the tool operator releases either trigger 16 or 18, pneumatic air is fed in a conventional manner into region 76 on the front side of piston 26 to drive the piston back to the position illustrated in FIG. 2 and open the tool blades.

For additional safety and ease of alignment, a shield assembly 78 is located around the working end of the blades. Support points 80 and 82 are located near the center of gravity of the tool and allow the tool to be suspended from overhead.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A toe web cutter comprising:
   a tool body including a reaction plate;
   at least one handle connected to the tool body for supporting and guiding the toe web cutter to a toe web on a carcass;
   an inner blade unit, the inner blade unit having a pair of side cutting edges and an end cutting edge;
   an outer blade unit, the inner and outer blade units being pivotally connected and cooperating to cut along the side cutting edges and the end cutting edge to remove a toe web from a carcass;
   a drive mechanism connected to the tool body for pivoting one of the inner or outer blade units relative to the other blade unit, the other blade unit remaining stationary relative to the tool body to define a toe web cutting location at a fixed position relative to the stationary blade unit and the tool body whereby the handle may be used to guide the fixed toe web cutting location into correct alignment with the toe web to be removed by aligning the stationary blade unit relative to the toe web, the drive mechanism including a drive rod;
   a link pivotally connected between an end of the drive rod and the pivoting blade unit;
   a trigger mechanism for operating the drive mechanism to remove the toe web after the stationary blade unit has been correctly aligned relative to the toe web, the trigger mechanism being proximate the handle and operable by hand while the at least one handle is being gripped; and
   a support wheel mounted on the drive rod and contacting the reaction plate to support the drive rod against transverse deflection.

2. The toe web cutter according to claim 1 wherein the link has a forked end, the wheel being mounted within the forked end of the link.

3. The toe web cutter according to claim 1 wherein the drive rod has a forked end, the wheel being mounted within the forked end of the drive rod.

4. The toe web cutter according to claim 1 wherein the drive rod and the link have forked ends, the wheel being mounted within the forked end of the link and the forked end of the link being mounted within the forked end of the drive rod.

5. The toe web cutter according to claim 1 wherein the inner blade unit comprises a hooked blade.

6. The toe web cutter according to claim 5 wherein the hooked blade includes a V-shaped groove between the side cutting edges.

7. The toe web cutter according to claim 1 wherein the outer blade unit comprises a pair of side blades and an end blade having a thickness comparable to a thickness of the inner blade unit, each side blade having an inner cutting edge cooperating with one of the side cutting edges of the inner blade unit and the end blade having an inner cutting edge cooperating with the end cutting edge of the inner blade unit.

8. A toe web cutter comprising:
   a tool body including a support surface;
   a pair of handles connected to the tool body for supporting and guiding the toe web cutter to a toe web on a carcass;
   an inner hooked blade, the inner blade having a pair of side cutting edges and an end cutting edge, the inner blade being pivotally mounted to the tool body;
   a pair of side blades having inner cutting edges, the side blades being mounted on opposite sides of the inner blade, the side blades also being mounted to remain stationary relative to the tool body;
   an end blade having an end cutting edge, the end blade being mounted between the side blades, the end cutting edges on the end blade and inner blade passing adjacent to each other as the inner blade pivots, the cutting edges on the side and end blades defining a toe web cutting location at a fixed position relative to the side blades and the tool body whereby the handle may be used to guide the fixed toe web cutting location into correct alignment with a toe web to be removed by aligning the side blades and end blade relative to the toe web;
   a drive mechanism connected to the tool body for driving the inner blade in pivoting motion relative to the tool body, the drive mechanism including a drive rod extending outward from the drive mechanism, the drive rod being connected to the inner blade through a link;
   a pair of trigger mechanisms for operating the drive mechanism to remove the toe web after the side blades and end blade have been correctly aligned relative to the toe web, the trigger mechanisms being proximate the handles and operable by hand while the handles are being gripped; and
   a wheel mounted at an end of the drive rod, the wheel rolling upon the support surface to support the drive rod against transverse deflection.

9. The toe web cutter according to claim 8 wherein the link has a forked end, the wheel being mounted in the forked end of the link.

10. The toe web cutter according to claim 8 wherein the drive rod has a forked end, the forked end of the link being mounted within the forked end of the drive rod and the wheel being mounted in the forked end of the link.

11. A toe web cutter comprising:

a tool body having a support surface;

a pair of handles connected to the tool body for supporting and guiding the toe web cutter to a toe web on a carcass;

an inner hooked blade, the inner blade having a pair of side cutting edges and an end cutting edge, the inner blade being pivotally mounted to the tool body;

a pair of side blades having inner cutting edges, the side blades being mounted on opposite sides of the inner blade, the side blades also being mounted to remain stationary relative to the tool body;

an end blade having an end cutting edge, the end blade being mounted between the side blades, the end cutting edges on the end blade and inner blade passing adjacent to each other as the inner blade pivots, the cutting edges on the side and end blades defining a toe web cutting location at a fixed position relative to the side blades and the tool body whereby the handle may be used to guide the fixed toe web cutting location into correct alignment with a toe web to be removed by aligning the side blades and end blade relative to the toe web;

a drive mechanism connected to the tool body for driving the inner blade in pivoting motion relative to the tool body, the drive mechanism including:
- a cylinder,
- a piston sliding in the cylinder, and
- a drive rod connected to the piston and extending outward from the drive mechanism;

a pair of trigger mechanisms for operating the drive mechanism to remove the toe web after the side blades and end blade have been correctly aligned relative to the toe web, the trigger mechanisms being proximate the handles and operable by hand while the handles are being gripped;

a link pivotally connected at one end to the drive rod and at an other end to the inner blade; and a wheel connected to the drive rod and rolling against the support surface to support the drive rod against transverse deflection.

* * * * *